United States Patent
Anschutz (10) Patent No.: US 10,389,791 B2
(45) Date of Patent: Aug. 20, 2019

(54) SYSTEM AND METHOD OF IMPLEMENTING QUALITY OF SERVICE OVER A PACKET-BASED NETWORK

(71) Applicant: AT&T INTELLECTUAL PROPERTY I, L.P., Atlanta, GA (US)

(72) Inventor: Thomas Anschutz, Conyers, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 15/234,778

(22) Filed: Aug. 11, 2016

(65) Prior Publication Data

US 2016/0352802 A1 Dec. 1, 2016

Related U.S. Application Data

(63) Continuation of application No. 13/652,196, filed on Oct. 15, 2012, now Pat. No. 9,438,483.

(51) Int. Cl.

| | |
|---|---|
| *G01R 31/08* | (2006.01) |
| *H04L 29/06* | (2006.01) |
| *H04L 12/24* | (2006.01) |
| *H04L 12/26* | (2006.01) |
| *H04L 1/00* | (2006.01) |
| *H04L 1/18* | (2006.01) |
| *H04L 1/20* | (2006.01) |

(52) U.S. Cl.
CPC .......... *H04L 65/80* (2013.01); *H04L 1/0076* (2013.01); *H04L 1/1819* (2013.01); *H04L 1/203* (2013.01); *H04L 41/5019* (2013.01); *H04L 43/0835* (2013.01); *H04L 65/4092* (2013.01); *H04L 41/5009* (2013.01)

(58) Field of Classification Search
CPC .............. H04L 41/5019; H04L 1/0057; H04L 41/5009; H04L 43/0835; H04L 47/10; H04L 43/08; H04L 43/50; H04L 65/80; G08C 25/02; G01R 31/08; H04J 1/16
See application file for complete search history.

(56) References Cited

U.S. PATENT DOCUMENTS

| | | |
|---|---|---|
| 6,577,648 B1 | 6/2003 | Raisenan et al. |
| 6,601,208 B2 | 7/2003 | Wu |
| 7,085,230 B2 * | 8/2006 | Hardy ............... H04L 29/06027 370/232 |
| 7,328,393 B2 | 2/2008 | Chawla et al. |
| 7,746,781 B1 | 6/2010 | Xiang |
| 7,817,615 B1 * | 10/2010 | Breau ................... H04W 28/24 370/349 |

(Continued)

OTHER PUBLICATIONS

"Differentiated Services", Wikipedia, Retrieved from http://en.wikipedia.org/wiki/Differentiated_services, Retrieved on Aug. 3, 2012, Wikimedia Foundation, San Francisco, CA, 7 pages.

*Primary Examiner* — Hanh N Nguyen
(74) *Attorney, Agent, or Firm* — Toler Law Group, PC (57) ABSTRACT

A method includes transmitting a first stream of packets from a first network endpoint to a second network endpoint. The first stream of packets includes a quality of service indicator having a value that indicates a packet loss rate tolerance. The method also includes receiving a retransmission request at the first network endpoint from the second network endpoint for retransmission of at least a portion of the first stream of packets.

20 Claims, 5 Drawing Sheets

(56) References Cited

U.S. PATENT DOCUMENTS

| | | |
|---|---|---|
| 7,995,475 B2 * | 8/2011 | Ramanujan ............ H04L 47/10 |
| | | 370/232 |
| 8,312,352 B2 | 11/2012 | Suneya |
| 8,423,854 B2 * | 4/2013 | Dinan .................. H04L 1/0003 |
| | | 714/748 |
| 8,826,102 B2 | 9/2014 | Liu et al. |
| 9,438,483 B2 * | 9/2016 | Anschutz ............ H04L 41/5019 |
| 2005/0047345 A1 | 3/2005 | Suh |
| 2005/0053003 A1 | 3/2005 | Cain et al. |
| 2005/0229074 A1 | 10/2005 | Chawla et al. |
| 2006/0075114 A1 | 4/2006 | Panasyuk et al. |
| 2010/0223523 A1 | 9/2010 | Dinan et al. |
| 2010/0278045 A1 | 11/2010 | Xiang |
| 2012/0192031 A1 | 7/2012 | Liu et al. |
| 2012/0230345 A1 | 9/2012 | Ovsiannikov |
| 2015/0229970 A1 | 8/2015 | Ma et al. |

* cited by examiner

SYSTEM AND METHOD OF IMPLEMENTING QUALITY OF SERVICE OVER A PACKET-BASED NETWORK

CLAIM OF PRIORITY

This application claims priority from, and is a continuation of, U.S. patent application Ser. No. 13/652,196, filed on Oct. 15, 2012, which is incorporated herein by reference in its entirety.

FIELD OF THE DISCLOSURE

The present disclosure is generally related to implementing quality of service over a packet-based network.

BACKGROUND

The Internet provides a benefit to applications and users through its broad connectivity. However, many applications, in addition to broad connectivity, require assurance of a level of transmission quality or quality of service (QoS). In unicast networks, reliable data transport is typically provided by mechanisms such as the Transmission Control Protocol (TCP). TCP provides for the retransmission of dropped or lost data packets. However, packet data delivery that involves multiple retransmissions may fail to support multicast networks or delay sensitive networks.

DETAILED DESCRIPTION

Systems and methods of implementing quality of service over a packet-based network are disclosed. Due to the unpredictable nature of certain packet-based networks (e.g., the Internet and other long-haul networks) service providers and application developers may not be able to provide reliable quality of service guarantees with respect to in-order packet delivery, packet error rate, packet delivery latency, etc. However, the described techniques may use forward error correction to implement quality of service over such packet-based networks. At a transmit endpoint, packets may be marked with a particular quality of service level (e.g., expedited forwarding, assured forwarding, best effort, etc.). Based on the quality of service level, forward error correction data may be added to the packets or otherwise transmitted with groups of packets. At a receive endpoint, lost (e.g., dropped) and/or corrupted packets may be recovered based on the forward error correction data. If the number and/or rate of lost packets exceeds an error tolerance (which may vary based on the particular quality of service level being implemented), a packet error may be reported to upper protocol layers. By adding packet recovery ability and delaying error reporting until a QoS-based threshold is exceeded, the disclosed systems and methods may enable implementation of various QoS levels over a packet-based network.

In one embodiment, a method includes receiving, at a second network endpoint, a stream of packets having a quality of service indicator and including forward error correction information from a first network endpoint, where at least one packet of the stream of packets is not received, or not recovered, at the second endpoint. The method further includes, at the second endpoint, in response to detecting that the at least one packet of the stream of packets is not received and based on the quality of service indicator, initiating a forward error correction decode operation to recover data of the at least one packet of the stream of packets by use of the forward error correction information.

In another embodiment, a method includes, at a first network endpoint, determining whether a second network endpoint supports receipt of a stream of packets having a quality of service indicator. The method further includes, at the first network endpoint, in response to determining that the second network endpoint supports receipt of the stream of packets, having the quality of service indicator, generating and sending the stream of packets (the stream of packets including the quality of service indicator and forward error correction data) to the second network endpoint.

In another embodiment, an apparatus includes a processor and a memory accessible to the processor. The memory includes instructions that, when executed by the processor, cause the processor to, at a first network endpoint, determine whether a second network endpoint supports receipt of a stream of packets having a quality of service indicator. The instructions may further cause the processor to, at the first network endpoint, in response to determining that the second network endpoint supports receipt of the stream of packets having the quality of service indicator, generate and send the stream of packets (the stream of packets including the first quality of service indicator and forward error correction data) to the second network endpoint.

Figure 1:
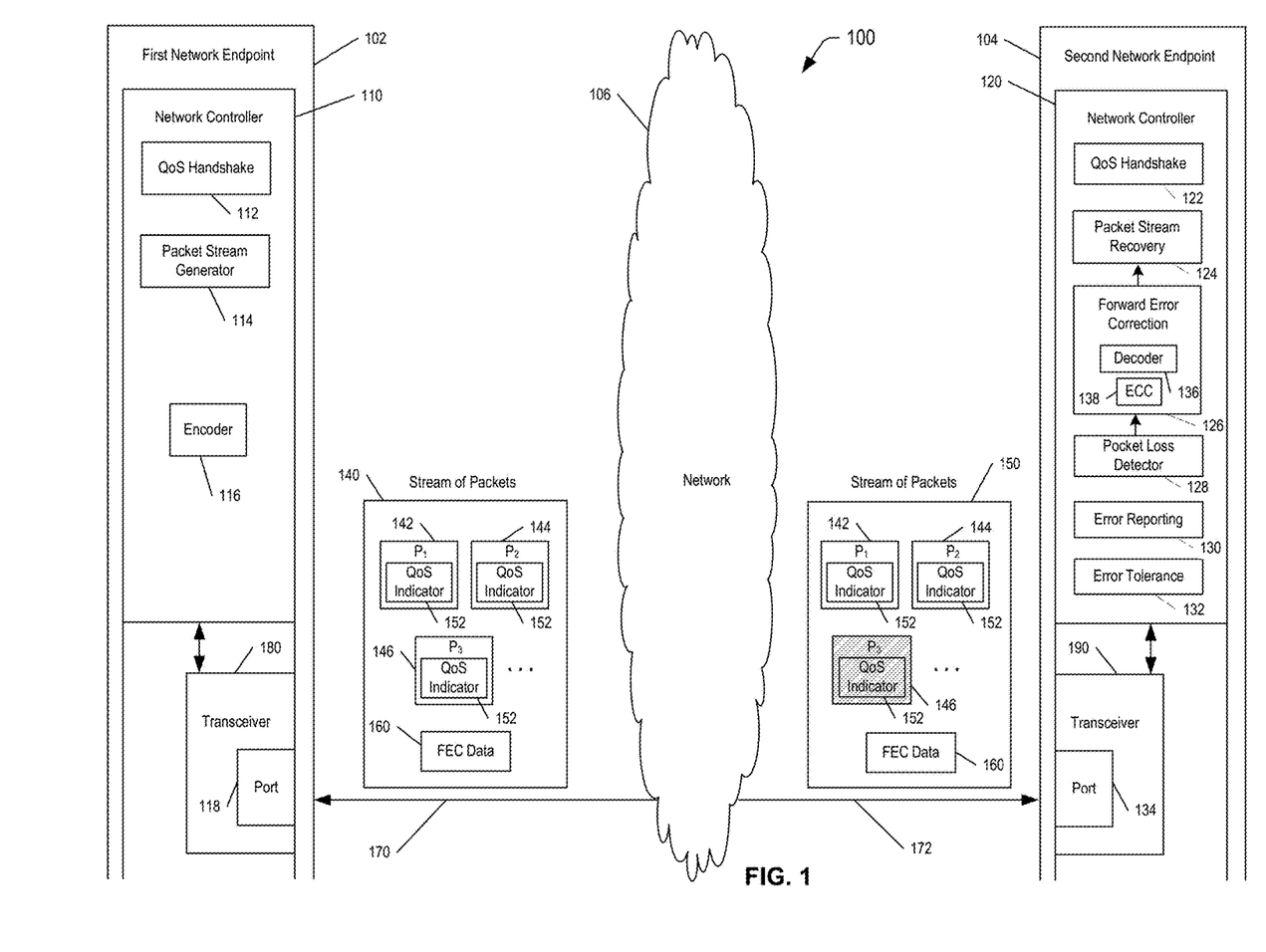
FIG. 1 is a first illustrative embodiment of a system to process quality of service information and implement one or more quality of service levels over a packet-based network and illustrates successful recovery of data from at least one dropped packet.

Referring to FIG. 1, a particular illustrative embodiment of a distributed communication system 100 is shown. The communication system 100 includes a first network endpoint 102, a computer communication network 106, and a second network endpoint 104. While the first network endpoint 102 and the second network endpoint 104 are shown, it should be understood that the network 106 may transmit data packets between more than two network endpoints. In a particular embodiment, the network 106 is a public data communication network, such as the Internet, and may transport data packets according to a TCP/IP protocol.

The first network endpoint 102 includes a network controller 110 and a transceiver 180. The transceiver 180 is coupled to a communication port 118. The network controller 110 may include a microprocessor that is capable of executing computer executable instructions. The network controller 110 may include quality of service handshake logic 112, a packet stream generator 114, and a data packet encoder 116. The network controller 110 also includes functionality for generating data packets to be communicated via the network 106 to the second network endpoint 104. In a particular illustrative embodiment, the network controller 110 is compatible with one or more industry communication standards in order to implement network communications according to various network layers. As an example, the network controller 110 may comply with a TCP/IP network protocol stack.

The network controller 110 may include a processor and a memory accessible to the processor. The memory includes instructions that are executable by the processor to perform various functions. For example, the network controller 110 may determine whether the second network endpoint 104 supports receipt of a stream of packets having a quality of service indicator. The network controller 110, in response to determining that the second network endpoint 104 supports receipt of a stream of packets having the quality of service indicator, may generate and send a stream of packets (the stream of packets including the quality of service indicator and including forward error correction data) to the second network endpoint 104. For example, the packet stream generator 114 within the network controller 110 may insert a quality of service indicator 152 and forward error correction data 160 into one or more packets of a stream of packets 140 to be generated and communicated.

In a particular illustrative embodiment, the first network endpoint 102 communicates the stream of packets 140 via the network 106 to the second network endpoint 104. The stream of packets 140 includes a group of packets. The group of packets includes a representative first packet 142, a representative second packet 144, and a representative third packet 146. The first packet 142 includes a first quality of service indicator 152. The second packet 144 also includes the quality of service indicator 152. The third packet 146 also includes the quality of service indicator 152. The group of packets includes forward error correction data 160. While three packets 142, 144, 146 are illustrated in FIG. 1, it should be understood that the stream of packets 140 may include a plurality of packets (e.g., more than three packets) and each of the plurality of packets may be grouped into various packet groups. Each of the packet groups may include forward error correction data 160.

The second network endpoint 104 includes a second network controller 120. The second network controller 120 also includes a processor and a memory that includes instructions executable by the processor to perform network controller functionality. The network controller 120 includes a quality of service handshake module 122, packet stream recovery logic 124, forward error correction logic 126, packet loss detection logic 128, an error reporting module 130, and an error tolerance 132. The forward error correction logic 126 includes a decoder 136 and error correction code (ECC) data 138. The second network endpoint 104 also includes a transceiver 190 that includes a second port 134. The transceiver 190 is similar to the transceiver 180 within the first network endpoint 102. In a particular illustrative embodiment, the transceiver 190 and the port 134 may be compliant with network industry standards for communication of data packets.

Prior to communicating the stream of packets 140, the network controller 110 may communicate a quality of service handshake message in accordance with quality of service handshake logic 112. The network controller 110, in accordance with the quality of service handshake logic 112, communicates various quality of service handshake messages (e.g., via the link 170 and the link 172) to the quality of service handshake module 122 of the network controller 120 at the second network endpoint 104. In response, the network controller 120, according to the quality of service handshake module 122, sends reply handshake messages (e.g., via the links 170, 172) which are received and detected by the quality of service handshake logic 112 at the first network controller 110. Upon determining, at the first network endpoint 102, that quality of service delivery is available at the second network endpoint 104 (e.g., the second network endpoint 104 supports receipt of a stream of packets having a quality of service indicator), the network controller 110 then proceeds to communicate packets having inserted therein the first quality of service indicator 152. In the event that a destination device does not include a quality of service handshake capability, the network controller 110 generates packets without including the quality of service indicator or the forward error correction data 160. Thus, the network controller 110 may communicate with endpoint devices that support quality of service handshaking while also communicating with other network endpoint devices that do not support communication of quality of service information.

The first network endpoint 102 may determine whether the second network endpoint 104 supports receipt of a stream of packets having a quality of service indicator and in response to determining that the second network endpoint 104 supports receipt of the stream of packets having the quality of service indicator, the first network endpoint 102 generates and sends the stream of packets 140 (the stream of packets 140 including the quality of service indicator 152 and the forward error correction data 160) to the second network endpoint 104. In a particular embodiment, the stream of packets 140 is communicated via a transport layer of an internet protocol suite via the network 106. The stream of packets 140 may be associated with a transmission control protocol (TCP) session. The transport layer may include a quality of service layer that supports packet data communicated between the first network endpoint 102 and the second network endpoint 104. The quality of service layer may be associated with the first port 118 and with the second port 134 as described. In a particular embodiment, the quality of service layer may be located below the transport (e.g., TCP) layer of a protocol stack (e.g., Open Systems Interconnect (OSI) protocol stack) at each of the network endpoints 102, 104, as further described herein.

The second network endpoint 104 may receive a second stream of packets 150 having the first quality of service indicator 152 and including the forward error correction data 160 transmitted by the first network endpoint 102. During operation, in the example of FIG. 1, at least one packet of the stream of packets 140 is not received by the second endpoint 104. For example, the third packet 146 may be lost (e.g., "dropped") and not received at the second network endpoint 104. The third packet 146 is indicated as lost by being grayed out in the second stream of packets 150 in FIG. 1. In response to detecting that the at least one packet is not received, and based on the quality of service indicator 152, a forward error correction decode operation is initiated to recover data of at least one packet of the stream of packets that was not received. The at least one packet that was not received is recovered by use of the forward error correction data 160.

In addition, the network controller 120 at the second network endpoint 104 may monitor the stream of packets 150 to determine a packet loss rate. The network controller 120 may compare the packet loss rate to the error tolerance 132 based on the quality of service indicator 152. In response to the packet loss rate not exceeding the error tolerance 132, forward error correction is performed to recover the one or more lost packets.

In a particular embodiment, the quality of service indicator 152 is associated with an expedited forwarding service level. In another embodiment, the quality of service indicator 152 is associated with an assured forwarding service level. Alternatively, the quality of service indicator may be associated with a best effort service level. Depending on the particular type of, or class of, the quality of service indicator 152, a different error tolerance 132 may be used. For example, the error tolerance 132 may be higher for a best effort service level than for an assured forwarding service level. Thus, a higher rate of packet loss may be tolerated when the quality of service is a best effort service level as opposed to communications using the assured forwarding service level. The quality of service indicator 152 may be used to classify various streams of packets with respect to error tolerance and retransmission rates due to packet loss and the frequency of retransmissions may be varied depending on the particular quality of service indicator classification. By reducing the need to retransmit data (e.g., by use of forward error correction and based on particular error tolerances for particular QoS levels), latency may be improved and applications may gain access to more bandwidth than they otherwise may have had access to.

During operation, the first network endpoint 102 communicates the stream of packets 140 via the network 106. Upon transmission, the network 106 communicates and delivers the second stream of packets 150 to the second network endpoint 104. In a particular illustrative embodiment, the second stream of packets 150 includes at least one packet that is missing from the original first stream of packets 140. For example, the third packet 146 is indicated as missing in the second stream of packets 150. Thus, while the original stream of packets 140 includes a first packet 142, a second packet 144, and a third packet 146, the second stream of packets 150 to be delivered to the second network endpoint 104 includes the first packet 142 and the second packet 144, but does not include the third packet 146 (e.g., a lost packet). The third packet 146 is indicated as being lost with diagonal marks indicating that the packet while originally transmitted was not received by the second network endpoint 104. In a particular illustrative embodiment, the third packet 146 may be lost, or alternatively, the third packet 146 may be delivered in a corrupted state such that the network controller 120 is unable to recover data from the corrupted packet.

The network controller 120 receives the second stream of packets 150 via the port 134 and the transceiver 190. The network controller 120 processes the second stream of packets 150 and successfully decodes and recovers the first packet 142 and the second packet 144. However, since the third packet 146 is lost, the network controller 120 does not recover or receive the third packet 146. The packet loss detector 128 within the network controller 120 recognizes that the third packet 146 has not been received. Upon detecting that the third packet 146 is not received, the packet loss detector 128 determines whether or not to recover or attempt to recover the third packet 146. The packet loss detector 128 indicates that a single packet (e.g., the third packet 146) is lost. The packet loss detector 128, after checking the error tolerance 132 corresponding to the quality of service indicator 152, determines that a loss of a single packet is within the error tolerance 132. Upon determining that the loss of the single packet is within the error tolerance 132, the packet loss detector 128 issues a command to the forward error correction logic 126 in order to perform forward error correction to recover the lost packet 146. Thus, the packet loss detector 128 sends an instruction to the forward error correction logic 126, which receives and uses the forward error correction data 160 in order to recover the lost packet 146 by performing error correction via the ECC data 138 (which may include or be based on the forward error correction data 160). The forward error correction logic 126 generates an error corrected packet to replace the lost packet 146. The packet stream recovery logic 124 thus receives the originally communicated packets 142 and 144 and receives an error corrected version of the lost packet 146. Alternatively, or in addition, the forward error correction logic 126 may generate an error corrected packet to replace a packet that is not received within a particular time period, such as a packet that is received outside its jitter window. The packet stream recovery logic 124 may receive the originally communicated packets 142 and 144 and may receive an error corrected version of the packet that is not received within the particular time period, which may reduce jitter in the second stream of packets 150.

The packet stream recovery logic 124 proceeds as if all packets were received without any error or loss. Thus, when the quality of service indicator 152 and the corresponding error tolerance 132 indicate that forward error correction 126 using the forward error correction data 160 may successfully recover a lost packet (e.g., packet 146), the network controller 120 may report successful completion of and recovery of all communicated packets within the second stream of packets 150. Thus, lost packets that are successfully recovered are transparent to upper layers of the network controller 120. In this situation, the network controller 120 does not need to send a retransmit request in order to receive the originally lost packet. Rather, the network controller 120 proceeds as if all packets were received. Reducing a number of dropped (e.g., lost) packets in a data transmission between a first network endpoint and a second network endpoint may reduce a need to retransmit data. By reducing the need to retransmit data, latency may be improved and applications (e.g., at devices including or coupled to the endpoints 102, 104) may gain access to more bandwidth than they otherwise may have had access to.

In a particular illustrative embodiment, the second stream of packets 150 is received at the second network endpoint 104 via a transport layer of an internet protocol suite where the transport layer includes a quality of service layer of data communicated between the first network endpoint 102 and the second network endpoint 104. The quality of service layers is associated with the first port 118 of the first network endpoint 102 and with the second port 134 of the second network endpoint 104. The stream of packets 140, 150 is sent from the first network endpoint 102 via the first port 118 to the second port 134 of the second network endpoint 104.

The second stream of packets 150 is received at the second network endpoint 104 via the transport layer of the internet protocol suite. The transport layer includes the quality of service layer. The transport layer and the quality of service layer are incorporated within transmissions according to a communication protocol and sent via communications links between the first network endpoint 102 and the second network endpoint 104.

In a particular embodiment, the quality of service layer is incorporated into a stack of an operating system that is associated with the first network endpoint 102 and the second network endpoint 104. For example, the network controller 110 may be controlled by an operating system in accordance with a network stack, and a quality of service layer is incorporated into the network stack associated with the operating system. Similarly, the network controller 120 may be controlled by an operating system and may operate in accordance with a network stack in which the quality of service layer is incorporated.

Reducing a number of dropped packets in a data transmission between a first network endpoint and a second network endpoint may reduce a need to retransmit data. By reducing the need to retransmit data, latency may be improved and applications may gain access to more bandwidth than they otherwise may have had access to.

Figure 2:
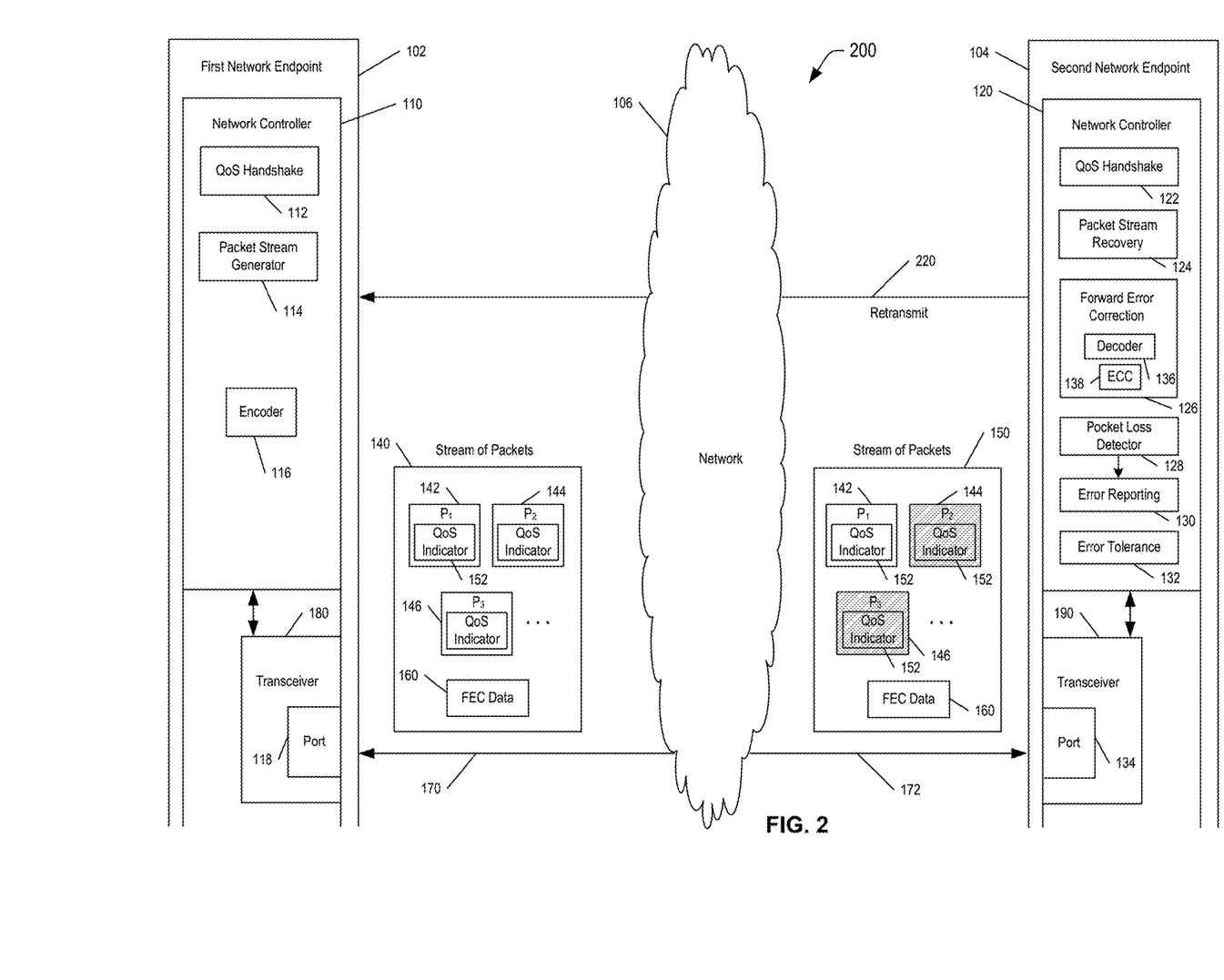
FIG. 2 is a second illustrative embodiment of a system to process quality of service information and implement one or more quality of service levels over a packet-based network and illustrates data packet retransmission.

Referring to FIG. 2, another particular illustrative embodiment of a distributed communication system 200 is shown. The communication system 200 includes the first network endpoint 102, the computer communication network 106, and the second network endpoint 104. The first network endpoint 102 includes the network controller 110, the transceiver 180, the communication port 118, the quality of service handshake logic 112, the packet stream generator 114, and the data packet encoder 116.

The second network endpoint 104 includes the second network controller 120. The second network controller 120 includes the quality of service handshake module 122, the packet stream recovery logic 124, the forward error correction logic 126, the packet loss detection logic 128, the error reporting module 130, and the error tolerance 132. The forward error correction logic 126 includes the decoder 136 and the error correction code data 138. The second network endpoint 104 also includes the transceiver 190 that includes the second port 134.

As explained above with respect to FIG. 1, in a particular illustrative embodiment, the network controller 120 may receive the second stream of packets 150 via the port 134 and the transceiver 190, and one or more packets of the second stream of packets 150 may be lost and/or delivered in a corrupted state. In FIG. 1, the lost packet(s) are represented by the third packet 146 being grayed out. As described with reference to FIG. 1, because the number and/or rate of lost packets do not exceed the error tolerance 132, the forward error correction logic 126 is able to generate error corrected packet(s) to replace the lost packet(s). In contrast to FIG. 1, FIG. 2 illustrates a scenario in which the number and/or rate of lost packets exceeds the error tolerance 132. For purposes of illustrating the higher number and/or rate of lost packets, both the second packet 144 and the third packet 146 are grayed out (indicating the packets 144 and 146 are lost or corrupted) in FIG. 2. In response to determining that the packet loss rate exceeds the error tolerance 132, the packet loss detector 128 may issue a command to the error reporting module 130 in order to report a packet loss to an upper level layer of the network controller 120. The error tolerance 132 may correspond to a maximum permissible error level for the particular quality of service level associated with the second stream of packets 150. A retransmission request 220 (e.g., a retransmit message) is transmitted from the second network endpoint 104 to the first network endpoint 102. The retransmit request 220 may signal the TCP session to back off the transmission rate of data for a particular application and retransmit the lost packet(s), thereby effectively reducing bandwidth available to the particular application.

It should be understood that while the transmission of data has been illustrated with respect to first and second streams of packets, that multiple streams of packets may be communicated and received. Moreover, determining whether one or more lost packets within a group of packets may be recovered using forward error correction or whether retransmission is required may be performed during data network communications. For example, another stream of packets having a second quality of service indicator including second forward error correction information may be received at the second network endpoint 104 from the first network endpoint 102 and may be processed by the network controller 120. At least a portion of the first stream of packets may be received at the second network endpoint 104 and, concurrently with receipt of at least a portion of the other stream of packets, at least one packet in the other stream of packets may not be received at the second endpoint 104. In response to the packet loss detector 128 detecting that at least one packet of the other stream of packets is not received at the second network endpoint 104, and based on the second quality of service indicator, the packet loss detector 128 may initiate a second forward error correction operation to recover data of the at least one packet of the other stream of packets that was not received by use of the second forward error correction information. Alternately, a retransmission of the at least one lost packet of the other stream of packets may be requested.

Figure 3:
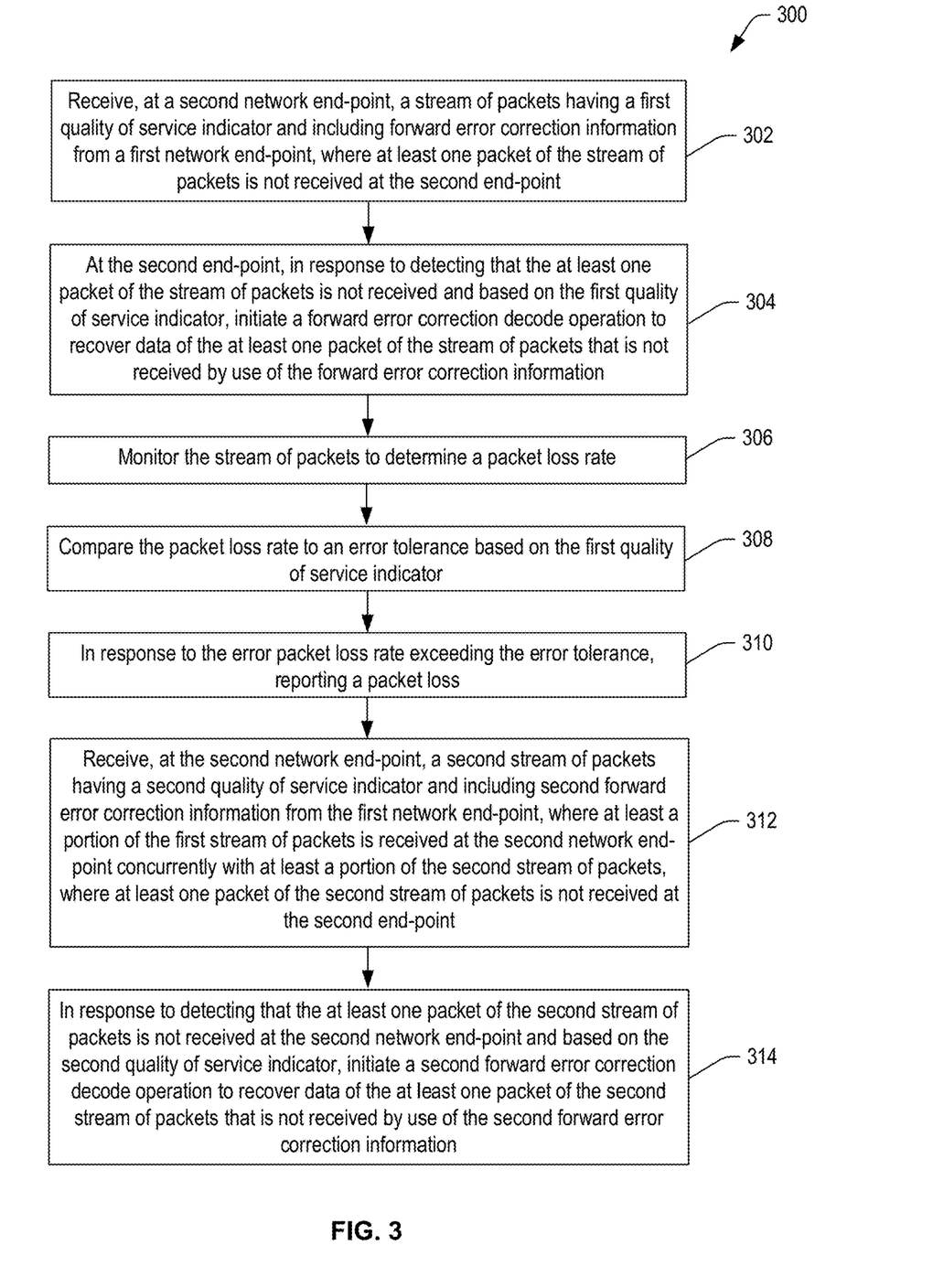
FIG. 3 is a first embodiment of a method of providing and processing quality of service information and implementing one or more quality of service levels over a packet-based network.

Referring to FIG. 3, a first embodiment of a method of implementing one or more quality of service levels over a packet-based network is shown and designated 300. The method 300 includes receiving, at a second network endpoint, a stream of packets from a first network endpoint, at 302. The stream of packets includes a first quality of service indicator and forward error correction information. At least one packet of the stream of packets is not received at the second endpoint. For example, the packet stream generator 114 of FIG. 1 may generate the stream of packets 140, where the stream of packets 140 includes the quality of service indicator 152 and the forward error correction information 160. The stream of packets 140 may be received at the second network endpoint 104 from the first network endpoint 102. As shown in FIG. 1, the third packet 146 of the stream of packets 140 was originally transmitted in the stream of packets 140 but may not be received at the second network endpoint 104.

The method 300 further includes, at the second endpoint, in response to detecting that the at least one packet of the stream of packets is not received and based on the first quality of service indicator, initiating a forward error correction decode operation to recover data of the at least one packet of the stream of packets that is not received by use of the forward error correction information, at 304. For example, at the second network endpoint 104, in response to detecting that the third packet 146 of the stream of packets 140 is not received (or received in a corrupted state), and based on an evaluation of the first quality of service indicator 152, a forward error correction decode operation may be initiated by the forward error correction module 126 to recover data of the third packet 146 using the forward error correction information 160.

The method 300 further includes monitoring the stream of packets to determine a packet loss rate, at 306. For example, the packet loss detector 128 may monitor the stream of packets 140 to determine whether a packet is received or not and to determine the packet loss rate. For example, a detected packet loss rate may be a number of packets lost, dropped, or otherwise not recovered successfully out of a particular number of packets or during a particular measurement time period. As an illustrative example, the packet loss rate may measure a number of packets lost out of a measured number of packets, such as 1000. For example, a packet loss rate of 0.1% would indicate one packet lost for every thousand packets received. As another example, when 40 packets are lost during a 10 second measurement time period, the packet loss rate may be 4 packets per second. Alternately, other packet loss rates or measures may be used.

The method 300 further includes comparing the packet loss rate to an error tolerance based on the first quality of service indicator, at 308. For example, the error tolerance 132 may include a table of error tolerance values or thresholds associated with a number of non-received (e.g., dropped) packets that are acceptable based on a level of service indicated by a particular quality of service indicator. For example, the packet loss rate may be compared to the error tolerance 132 that is associated with the first quality of service indicator 152.

The method 300 further includes, in response to the packet loss rate exceeding the error tolerance, reporting a packet loss, at 310. For example, if the packet loss rate is not within the error tolerance based on the first quality of service indicator, a packet loss may be reported to an upper level layer of the network controller 120 and the retransmit signal 220 of FIG. 2 may be sent from the second network endpoint 104 to the first network endpoint 102. If the packet loss rate is within the error tolerance based on the first quality of service indicator, forward error correction may be performed to recover the lost packet(s).

To illustrate, upon detecting that the third packet 146 is not received, the packet loss detector 128 may determine whether or not to recover (or attempt to recover) the third packet 146. Upon determining that the packet loss of the third packet 146 is within the error tolerance 132, the packet loss detector 128 may issue a command to the forward error correction logic 126 in order to perform forward error correction to recover the third packet 146. The packet loss detector 128 may send an instruction to the forward error correction logic 126, which receives and uses the forward error correction data 160 in order to perform an error correction operation via the ECC 138 and to recover the third packet 146. The forward error correction logic 126 may generate an error corrected packet to replace the third packet 146. The packet stream recovery logic 124 may receive the originally communicated packets 142 and 144 and receives an error corrected version of the third packet 146. Upon determining that the packet loss of the third packet 146 exceeds the error tolerance 132, the packet loss detector 128 may issue a command to the error reporting module 130 in order to report a packet loss to an upper level layer of the network controller 120.

The method 300 further includes receiving, at the second network endpoint, another stream of packets having a second quality of service indicator including second forward error correction information from the first network endpoint, at 312. At least a portion of the first stream of packets is received at the second network endpoint and concurrently with receipt of at least a portion of the other stream of packets, and at least one packet in the other stream of packets is not received at the second endpoint. In response to detecting that at least one packet of the other stream of packets is not received at the second network endpoint and based on the second quality of service indicator, the method 300 includes initiating a second forward error correction operation to recover data of the at least one packet of the other stream of packets that was not received by use of the second forward error correction information, at 314. It should be understood that while the method 300 is illustrated with respect to first and second streams of packets, that multiple streams of packets may be communicated and received and the method of determining, based on an error packet loss rate, whether a lost packet within a group of packets may be recovered using forward error correction or whether to request retransmission may be performed during data network communications.

Reducing a number of dropped packets in a data transmission between a first network endpoint and a second network endpoint may reduce a need to retransmit data. By reducing the need to retransmit data, latency may be improved and applications may gain access to more bandwidth than they otherwise may have had access to.

Figure 4:
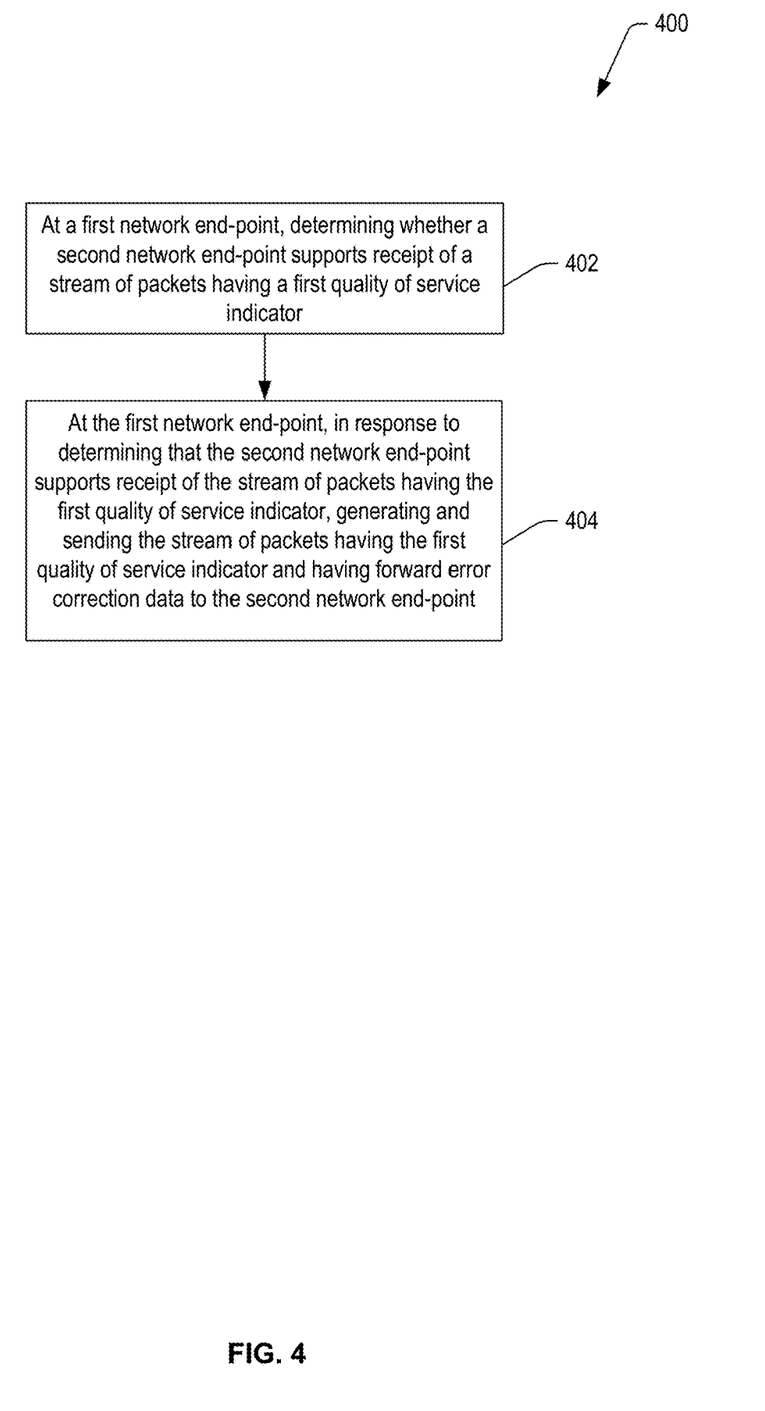
FIG. 4 is a second embodiment of a method of providing and processing quality of service information and implementing one or more quality of service levels over a packet-based network.

Referring to FIG. 4, a second embodiment of a method of implementing one or more quality of service levels over a packet-based network is shown and designated 400. The method 400 includes, at a first network endpoint, determining whether a second network endpoint supports receipt of a stream of packets having a first quality of service indicator, at 402. For example, at the first network endpoint 102 of FIG. 1, the network controller 110, in accordance with the quality of service handshake logic 112, may communicate various quality of service handshake messages via the link 170 and the link 172 to the quality of service handshake module 122 of the network controller 120 at the second network endpoint 104. In response, the network controller 120, according to the quality of service handshake module 122, may send reply handshake messages via the links 170, 172, where the reply handshake messages are received and detected by the quality of service handshake logic 112 at the first network controller 110.

The method 400 further includes, at the first network endpoint, in response to determining that the second network endpoint supports receipt of the stream of packets having the first quality of service indicator, generating and sending the stream of packets (the stream of packets including the first quality of service indicator and forward error correction data) to the second network endpoint, at 404. For example, upon determining that the quality of service delivery is available at the second network endpoint 104, (e.g., the second network endpoint 104 supports receipt of a stream of packets having a first quality of service indicator), the network controller 110 of the first network endpoint 102 may communicate packets that include the first quality of service indicator 152 and forward error correction data 160 inserted therein. For example, the packet stream generator 114 may insert the first quality of service indicator 152 and the forward error correction data 160 into one or more packets of the stream of packets 140.

Figure 5:
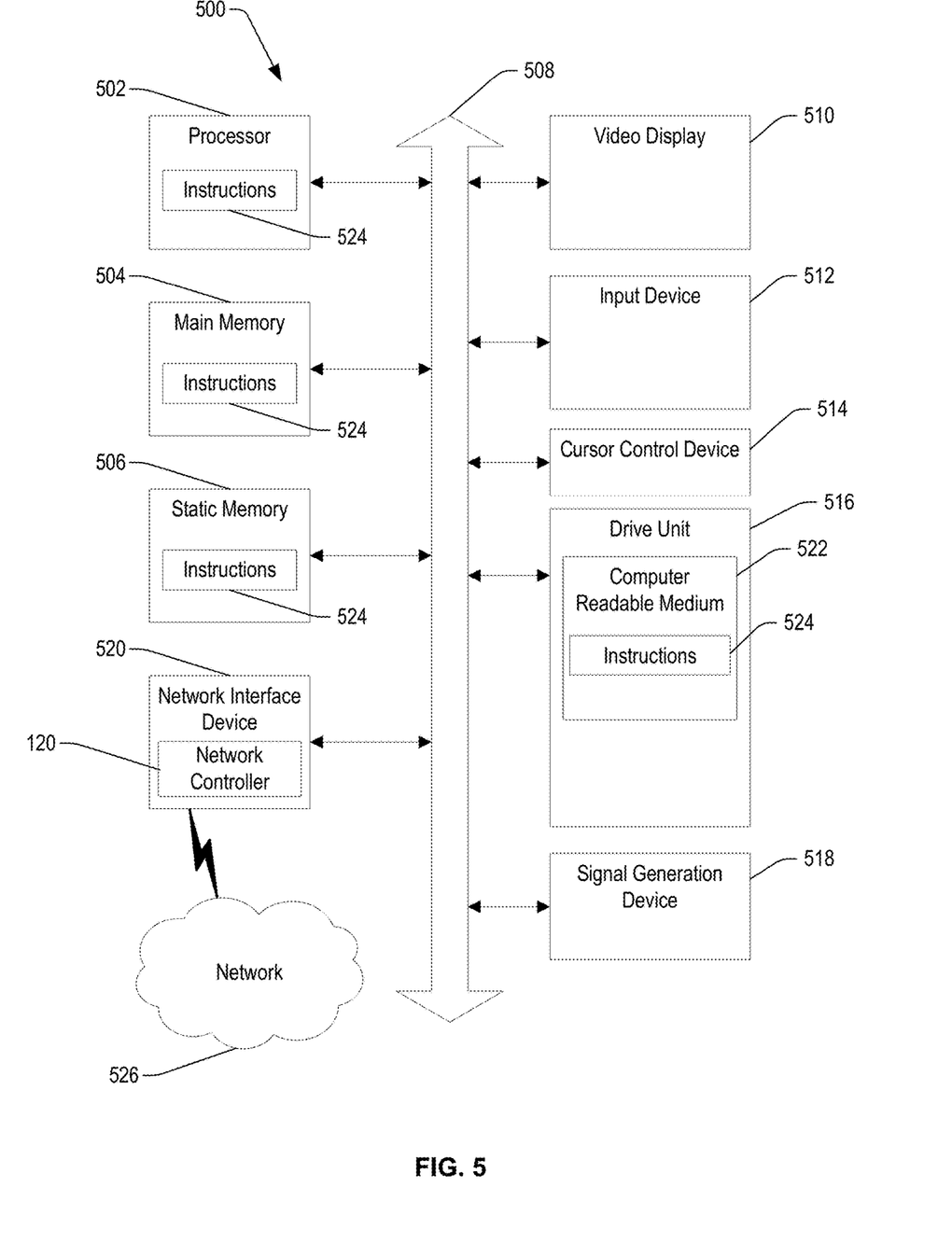
FIG. 5 is a block diagram of an illustrative embodiment of a computer system operable to support the various methods, systems, and computer readable media disclosed with respect to FIGS. 1-4.

Referring to FIG. 5, an illustrative embodiment of a computer system is shown and designated 500. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices. For example, the computer system 500 or portions thereof may implement, include, or be included within any one or more of the devices illustrated in FIGS. 1-4, such as the first network endpoint 102 of FIG. 1-2 and/or the second network endpoint 104 of FIGS. 1-2. Further, the computer system 500 or portions thereof may be used to perform any one or more of the functions and methods described with reference to FIGS. 1-4, such as the method 300 of FIG. 3 and/or the method 400 of FIG. 4.

In a networked deployment, the computer system 500 may operate in the capacity of a server or as a client user computer in a server-client user network environment, or as a peer computer system in a distributed peer-to-peer or network environment. The computer system 500 can also be implemented as or incorporated into various devices, such as a set top box device (STB), a digital video recorder (DVR) device, a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, a network router, switch or bridge, or any other machine capable of executing a set of instructions (sequential or otherwise) that specify actions to be taken by that machine. In a particular embodiment, the computer system 500 can be implemented using electronic devices that provide voice, video or data communication. Further, while a single computer system 500 is illustrated, the term "system" shall also be taken to include any collection of systems or sub-systems that individually or jointly execute a set, or multiple sets, of instructions to perform one or more computer functions.

It should be noted that the described techniques may be applied in data center overlay fabrics. For example, transmit and receive endpoints may be virtual switches that are supported by computer hypervisors (vSwitches), and best effort Ethernet switches may form/provide access to the Internet. Further, a set of tunnels may be created between the switches to create an overlay network. In such embodiments, QoS implementation by selectively using FEC as described herein may be applied to the tunnels and endpoints (e.g., in a virtual extensible local area network (VXLAN)).

As illustrated in FIG. 5, the computer system 500 may include a processor 502, e.g., a central processing unit (CPU), a graphics processing unit (GPU), or both. Moreover, the computer system 500 can include a main memory 504 and a static memory 506 that can communicate with each other via a bus 508. As shown, the computer system 500 may further include a video display unit 510, such as a liquid crystal display (LCD), an organic light emitting diode (OLED), a flat panel display, or a solid state display. Additionally, the computer system 500 may include an input device 512, such as a keyboard, and a cursor control device 514, such as a mouse. Such input devices may enable interaction with various GUIs and GUI controls. The computer system 500 can also include a disk drive unit 516, a signal generation device 518, such as a speaker or remote control, and a network interface device 520. The network interface device 520 may include a network controller, as shown. For example, the network controller may be the network controller 110 or the network controller 120 of FIGS. 1-2 and may be used to provide and process quality of service information and implement quality of service levels over a packet-based network, as described herein.

In a particular embodiment, as depicted in FIG. 5, the disk drive unit 516 may include a computer-readable medium 522 in which one or more sets of instructions 524, e.g., software, can be embedded. Further, the instructions 524 may embody one or more of the methods or logic as described herein, such as the methods described with reference to FIGS. 3 and 4. For example, the instructions 524 may include instructions to determine whether a second network endpoint supports receipt of a stream of packets having a first quality of service indicator, and to generate and send, from a first network endpoint to the second network endpoint, a stream of packets having a quality of service indicator and including forward error correction data. In a particular embodiment, the instructions 524 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable storage medium that includes instructions 524 so that a device connected to a network 526 can communicate voice, video or data over the network 526. Further, the instructions 524 may be transmitted or received over the network 526 via the network interface device 520.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for communication include TCP/IP, UDP/IP, HTML, HTTP, CDMA, VXLAN, NVGRE, STT, GRE, GTP, TDMA, FDMA, OFDMA, SC-FDMA, GSM, EDGE, evolved EDGE, UMTS, Wi-Max, GPRS, 3GPP, 3GPP2, 4G, LTE, high speed packet access (HSPA), HSPA+, and 802.11x. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method comprising:
    transmitting a first handshake message from a first network endpoint to a second network endpoint;
    after receiving a second handshake message from the second network endpoint, transmitting a first stream of packets from the first network endpoint to the second network endpoint, wherein each of multiple packets of the first stream of packets includes a quality of service indicator corresponding to a first packet loss rate tolerance associated with the first stream of packets;
    receiving a retransmission request at the first network endpoint from the second network endpoint for retransmission of at least a portion of the first stream of packets in response to a determination by the second network endpoint, based on the quality of service indicator, that a packet loss rate at the second network endpoint exceeds the first packet loss rate tolerance;
    sending a third handshake message from the first network endpoint to a third network endpoint;
    receiving a second reply handshake from the third network endpoint responsive to the third handshake message;
    determining whether the third network endpoint supports quality of service indicator fields based on the second reply handshake; and
    based on determining that the third network endpoint does not support quality of service indicator fields, transmitting a second stream of packets from the first network endpoint to the third network endpoint, wherein the second stream of packets does not include any quality of service indicator field.

2. The method of claim 1, further comprising:
    identifying a particular packet of the first stream of packets indicated in the retransmission request; and
    transmitting a second stream of packets to the second network endpoint, wherein the second stream of packets includes the particular packet.

3. The method of claim 1, further comprising transmitting a second stream of packets to the second network endpoint after receiving the retransmission request, wherein the first stream of packets is transmitted at a first rate, wherein the second stream of packets is transmitted at a second rate, and wherein the second rate is less than the first rate.

4. The method of claim 1, further comprising:
    identifying a first rate at which the first stream of packets is transmitted;
    in response to the retransmission request:
        determining to reduce a transmission rate; and
        selecting a second rate that is less than the first rate; and
    transmitting a second stream of packets at the second rate to the second network endpoint.

5. The method of claim 1, wherein the second handshake message is a reply handshake, and further comprising determining whether the second network endpoint supports quality of service indicator fields based on the reply handshake, wherein the first stream of packets is sent responsive to the second network endpoint supporting quality of service indicator fields.

6. The method of claim 1, wherein the quality of service indicator is associated with an expedited forwarding service level, an assured forwarding service level, or a best effort service level.

7. The method of claim 1, further comprising transmitting a second stream of packets from the first network endpoint to the second network endpoint, wherein the second stream of packets includes a second quality of service indicator corresponding to a second packet loss rate tolerance of the second stream of packets.

8. The method of claim 7, wherein the first packet loss rate tolerance is associated with a first priority that is higher than a second priority, the second priority associated with the second packet loss rate tolerance, and wherein the second packet loss rate tolerance is associated with a higher acceptable number of lost packets than the first packet loss rate tolerance.

9. The method of claim 1, wherein the first handshake message and the second handshake message do not include the quality of service indicator.

10. The method of claim 1, further comprising:
before transmitting the first stream of packets, determining a priority of the first stream of packets; and
selecting the quality of service indicator based on the priority, wherein the quality of service indicator enables the second network endpoint to identify the first packet loss rate tolerance.

11. A computer-readable memory device that stores instructions that, when executed by a processor, cause the processor to perform operations, the operations comprising:
transmitting a first handshake message from a first network endpoint to a second network endpoint;
after receiving a second handshake message from the second network endpoint, transmitting a first stream of packets from the first network endpoint to the second network endpoint, wherein each of multiple packets of the first stream of packets includes a quality of service indicator corresponding to a first packet loss rate tolerance associated with the first stream of packets;
receiving a retransmission request from the second network endpoint for retransmission of at least a portion of the first stream of packets in response to a determination by the second network endpoint, based on the quality of service indicator, that a packet loss rate at the second network endpoint exceeds the first packet loss rate tolerance;
sending a third handshake message from the first network endpoint to a third network endpoint;
receiving a second reply handshake from the third network endpoint responsive to the third handshake message;
determining whether the third network endpoint supports quality of service indicator fields based on the second reply handshake; and
based on determining that the third network endpoint does not support quality of service indicator fields, transmitting a second stream of packets from the first network endpoint to the third network endpoint, wherein the second stream of packets does not include any quality of service indicator field.

12. The computer-readable memory device of claim 11, wherein the retransmission request identifies a plurality of particular packets of the first stream of packets that were not received by the second network endpoint, wherein the operations further comprise transmitting a second stream of packets from the first network endpoint to the second network endpoint, and wherein the second stream of packets includes the plurality of particular packets identified in the retransmission request.

13. The computer-readable memory device of claim 11, wherein the first stream of packets includes forward error correction information, and wherein the first packet loss rate tolerance corresponds to a number of packets that are recoverable using the forward error correction information.

14. The computer-readable memory device of claim 13, wherein the quality of service indicator is distinct from the forward error correction information.

15. The computer-readable memory device of claim 11, wherein the first stream of packets includes a first group of multiple packets and a second group of multiple packets, and wherein each of the first group of multiple packets and the second group of multiple packets includes forward error correction data.

16. The computer-readable memory device of claim 11, wherein the first stream of packets is sent via a transport layer to the second network endpoint, and wherein the transport layer includes a quality of service layer.

17. The computer-readable memory device of claim 11, wherein the first stream of packets is associated with a transmission control protocol session, wherein a first packet of the first stream of packets includes the quality of service indicator, and wherein a second packet of the first stream of packets includes the quality of service indicator.

18. An apparatus comprising:
a processor; and
a memory accessible to the processor, wherein the memory includes instructions executable by the processor to perform operations, the operations including:
transmitting a first handshake message from a first network endpoint to a second network endpoint;
after receiving a second handshake message from the second network endpoint, transmitting a first stream of packets from the first network endpoint to the second network endpoint, wherein each of multiple packets of the first stream of packets includes a quality of service indicator corresponding to a first packet loss rate tolerance associated with the first stream of packets;
receiving a retransmission request from the second network endpoint for retransmission of at least a portion of the first stream of packets in response to a determination by the second network endpoint, based on the quality of service indicator, that a packet loss rate at the second network endpoint exceeds the first packet loss rate tolerance;
sending a third handshake message from the first network endpoint to a third network endpoint;
receiving a second reply handshake from the third network endpoint responsive to the third handshake message;
determining whether the third network endpoint supports quality of service indicator fields based on the second reply handshake; and
based on determining that the third network endpoint does not support quality of service indicator fields, transmitting a second stream of packets from the first network endpoint to the third network endpoint, wherein the second stream of packets does not include any quality of service indicator field.

19. The apparatus of claim 18, further comprising a transceiver coupled to the processor.

20. The apparatus of claim 18, further comprising packet stream generator circuitry configured to generate the first stream of packets.

* * * * *